United States Patent [19]

Sperk, Jr. et al.

[11] Patent Number: 5,334,647

[45] Date of Patent: Aug. 2, 1994

[54] FIBER-REINFORCED THERMOPLASTIC MOLDING COMPOSITIONS

[75] Inventors: James M. Sperk, Jr., Parma; Biing-lin Lee, Broadview Heights; James W. Summers, Bay Village; Edward M. Faber, deceased, late of Avon Lake, all of Ohio, by Sharon M. Faber, executrix

[73] Assignee: The B.F. Goodrich Company, Akron, Ohio

[21] Appl. No.: 86,474

[22] Filed: Jul. 1, 1993

Related U.S. Application Data

[62] Division of Ser. No. 759,965, Sep. 16, 1991, Pat. No. 5,225,476.

[51] Int. Cl.$^5$ .............................................. C08L 75/00
[52] U.S. Cl. .................................. 524/507; 524/537; 524/538; 428/423.4
[58] Field of Search ................ 524/507, 537, 538; 428/423.4

[56] References Cited

U.S. PATENT DOCUMENTS

| | | | |
|---|---|---|---|
| 2,623,031 | 12/1952 | Snyder | 260/45.4 |
| 3,431,224 | 3/1969 | Goldblum | 260/13 |
| 3,651,014 | 3/1972 | Witsiepe | 260/75 |
| 3,654,219 | 4/1972 | Boyer et al. | 260/41.5 |
| 3,660,357 | 5/1972 | Kolycheck | 260/77.5 |
| 3,678,129 | 7/1972 | Flecher | 260/23 |
| 3,763,109 | 10/1973 | Witsiepe | 260/75 |
| 3,795,715 | 3/1974 | Cherdron et al. | 260/823 |
| 3,850,873 | 11/1974 | Wurmb et al. | 260/37 |
| 3,890,279 | 6/1975 | Wolfe, Jr. | 260/75 |
| 3,896,078 | 7/1975 | Hoeschele | 260/45.9 |
| 3,970,717 | 7/1976 | Muller-Albrecht et al. | 260/859 |
| 4,017,558 | 4/1977 | Schmidt et al. | 260/876 |
| 4,034,016 | 7/1977 | Baron et al. | 260/860 |
| 4,035,440 | 7/1977 | Khanna et al. | 260/859 |
| 4,141,879 | 2/1979 | McCarroll | 260/37 |
| 4,174,358 | 11/1979 | Epstein | 525/183 |
| 4,179,479 | 12/1979 | Carter, Jr. | 525/66 |
| 4,223,126 | 9/1980 | Keck | 528/305 |
| 4,238,574 | 12/1980 | Megna | 525/130 |
| 4,277,577 | 7/1981 | Burg | 525/154 |
| 4,342,847 | 8/1982 | Goyert | 525/66 |
| 4,350,792 | 9/1982 | Goswami et al. | 525/129 |
| 4,350,799 | 9/1982 | Schmelzer et al. | 525/453 |
| 4,355,155 | 10/1982 | Nelsen | 529/301 |
| 4,366,296 | 12/1982 | Kitagawa et al. | 526/77 |
| 4,369,285 | 1/1983 | Sanderson | 524/538 |
| 4,381,364 | 4/1983 | Georgacopoulos et al. | 524/373 |
| 4,423,185 | 12/1983 | Matsumoto et al. | 525/66 |
| 4,567,236 | 1/1986 | Goldwasser et al. | 525/127 |
| 4,643,949 | 2/1987 | Kolycheck et al. | 428/425.9 |
| 4,752,639 | 6/1988 | Haller et al. | 525/66 |
| 4,808,665 | 2/1989 | Patel et al. | 525/133 |
| 4,877,856 | 10/1989 | Hall et al. | 528/44.79 |
| 4,883,837 | 11/1989 | Zabrocki | 525/66 |
| 4,912,177 | 3/1990 | Skochdopole et al. | 525/454 |

FOREIGN PATENT DOCUMENTS

| | | |
|---|---|---|
| 0277630 | 8/1988 | European Pat. Off. |
| 0342344 | 11/1989 | European Pat. Off. |
| 1928369 | 1/1970 | Fed. Rep. of Germany |
| 3802753 | 8/1989 | Fed. Rep. of Germany |
| 61-149330 | 7/1986 | Japan |

OTHER PUBLICATIONS

Encyclopedia of Polymer Science and Engineering, John Wiley & Sons, Inc. New York vol. 1, pp. 388–426, 452–470; vol. 2, pp. 590–605; vol. 6, pp. 383–522; vol. 11, pp. 286, 648–718; vol. 12, pp. 49–52, 217–256; vol. 13, pp. 1–30, 196–211, 243–303, 464–531; vol. 16, pp. 1–246; vol. 17, pp. 295–376.

*Primary Examiner*—Paul R. Michl
*Assistant Examiner*—Edward J. Cain
*Attorney, Agent, or Firm*—Helen A. Odar

[57] ABSTRACT

Thermoplastic molding compositions and articles comprise immiscible thermoplastic polymer components and reinforcing fibers. The immiscible thermoplastic polymer components and the fibers are blended together under high shear conditions. The molding composition generally contains at least two phases and has an extremely smooth and fiber-free surface. Generally, very good physical properties are obtained such as high impact resistance, high heat distortion temperatures, high tensile modulus, high flex modulus, and the like. A desired blend of thermoplastic components is thermoplastic polyurethane and polyethyleneterephthalate with glass fibers.

20 Claims, No Drawings

FIBER-REINFORCED THERMOPLASTIC MOLDING COMPOSITIONS

This is a division of application Ser. No. 07/759,965 filed Sep. 16, 1991 now U.S. Pat. No. 5,225,476.

FIELD OF THE INVENTION

The present invention relates to thermoplastic molding compositions and more particularly to a blend of generally immiscible thermoplastic matrix polymers which can be readily combined with reinforcing fibers under moderate to high shear to provide a molding composition useful for molding parts substantially free from shrinkage and having very smooth substantially fiber free surfaces.

BACKGROUND

Thermoplastic polymers combined with glass reinforcing fibers have been used in the past to produce molding compositions capable of being molded under heat and pressure to form plastic molded parts. Blends of thermoplastic polymers were often utilized in an effort to overcome deficiencies in physical properties of one or both thermoplastic polymers. The blends related to compatible or miscible polymers wherein the polymers were mutually soluble or one polymer was soluble in the other. If the two desired polymers were not miscible, then a third solubilizing polymer was added to provide solubilizing characteristics to the two desired polymers and impart compatibility to the overall polymeric mixture.

In the past, in order to obtain a smooth surface on molded plastic parts, a two-component injection molding process has been utilized wherein a second polymeric composition was injected and molded over a first fiber-reinforced polymer to achieve a smooth surface lamina. The two-component molding process, however, is difficult to control and operate in that the two separate molding compositions require controlled extruded ratios of the respective polymers, and the like.

U.S. Pat. No. 4,179,479 to Russell P. Carter, Jr. relates to novel thermoplastic polyurethane materials containing a processing aid. More particularly, the patent relates to a thermoplastic polyurethane composition comprising: (A) from 40 to 100 percent by weight of a thermoplastic polyurethane, (B) from 0 to 60 percent by weight of a thermoplastic polymer selected from the group consisting of thermoplastic polycarbonates, thermoplastic polyoxymethylenes, thermoplastic acrylonitrile/butadiene/styrene graft copolymers, thermoplastic polybutylene terephthalates, thermoplastic polyethylene terephthalates, and mixtures thereof and (C) from 0.5 to 10 percent by weight based on the amount of (A) and (B), of a processing aid which is an acrylic polymer having a number average molecular weight of from 500,000 to 1,500,000.

U.S. Pat. No. 4,277,577 to Burg, et al., provides a molding composition of a mixture of an oxymethylene polymer, an elastomer having a softening temperature of below the crystallite melting point of the oxymethylene polymer and a second order transition temperature of from −120° to +30° C., and a segmented thermoplastic copolyester.

U.S. Pat. No. 4,369,285 to Sanderson, et al., relates to reinforced thermoplastic molding compositions comprising polyamides and from 0.1 to 10 percent by weight polyurethanes.

U.S. Pat. No. 4,141,879 to Glenn G. McCarroll relates to a thermoplastic material for use under conditions demanding high strength at elevated temperatures, e.g., for under-the-hood automotive or truck components. The material is essentially a three-component alloy of a homopolymer polyamide, a copolymer polyamide, and polyurethane reinforced with a relatively small amount of glass fibers and containing normal amounts of heat stabilizers, ultraviolet screen materials, etc.

U.S. Pat. No. 4,350,799 to Hans G. Schmelzer, et al., relates to a molding composition comprising an intimate, well dispersed blend of thermoplastic polyurethane, thermoplastic polyphosphonate and thermoplastic polycarbonate which composition is characterized by an improved level of flame resistance.

Japanese Publication 61149330, dated Jul. 8, 1986, relates to an injection-molded product having a smooth surface which is prepared from a blend containing 10 parts by weight of polypropylene and 90 parts by weight of inorganic filled polypropylene. There is little, if any, significant change in physical properties.

SUMMARY OF THE INVENTION

Molding compositions of the present invention generally relate to two relatively immiscible thermoplastic polymer components. One such component generally has a relatively high viscosity, and the other component a relatively low viscosity at a suitable or desirable processing temperature. At the processing temperature, desirably only minimal degradation, if any, of either component occurs. During processing under usually moderate to high shear conditions, effective amounts of fibers are added to yield generally a two-phase composition having good adhesion between the components as well as good physical properties such as high heat distortion temperatures, high impact resistance, high tensile modulus, high flexural modulus, and the like, as well as very little shrinkage during molding. Although the composition contains fibers therein, the surface of the molded article is generally fiber-free and is extremely smooth.

DETAILED DESCRIPTION OF THE INVENTION

According to the present invention, it has been found that thermoplastic molding compositions having good flow at the processing temperature and typically excellent end-product physical properties can be produced by selecting relatively immiscible thermoplastic polymers and blending or compounding the same under at least moderate shear conditions with reinforcing fibers, and substantially molding the same under high shear conditions such as in injection molding. Although more than two thermoplastic components can be utilized, with the third or additional component being either immiscible or miscible with either of the first two components but compatible with each of said two components, generally only two such components are required. The remaining portion of the specification shall thus often be limited to a discussion of a two-component immiscible system although it is to be understood that additional components can be utilized. By the term "immiscible," it is meant that there are at least two polymer phases as detected by thermal analysis, thermal mechanical analysis, or microscopy, or the like.

The shear required in initially blending the thermoplastic polymer components together during or at the compounding stage generally is at least moderate. That is, only enough shear is required to disperse the fibers and the various immiscible polymers to produce generally a two-phase blend. The compounding shear is carried out at a temperature which is similar or the same as the subsequent processing temperature. By the term "two-phase blend," it is meant that one of the thermoplastic polymer components is generally dispersed within the other component such that two separate phases exist, or when a third or additional thermoplastic polymer component is utilized possibly three or more separate phases exist. The amount of shear utilized in the compounding stage is generally at least 5 reciprocal seconds to about 1,000 reciprocal seconds, desirably at least 50 reciprocal seconds to about 700 or 800 reciprocal seconds, and preferably froom about 50 reciprocal seconds to about 500 reciprocal seconds, or at any suitable shear rate provided that the fibers are not unduly broken or reduced in size. The compounded molded composition is generally preformed into any conventional shape such as particles, pellets and the like so that it can subsequently be utilized in a high shear molding apparatus or operation to yield an end product or article. In the forming of the end product or article, a high shear apparatus is utilized such that the shear rate is generally at least 100 reciprocal seconds, desirably at least 500 reciprocal seconds, more desirably at least 800 reciprocal seconds, preferably at least 1,000 reciprocal seconds, up to a value of about 3,000 reciprocal seconds.

Another general requirement of the present invention is that the immiscible thermoplastic polymer component desirably has a relatively dissimilar viscosity at a specific or suitable processing temperature. That is, whenever the two, or more, relatively immiscible thermoplastic polymer components are blended with each other and fibers, one component has a relatively low viscosity in comparison with the other, or more, thermoplastic polymer components which have a generally higher viscosity at the processing or blending temperature. Often the low viscosity thermoplastic polymer component forms a continuous phase, and the high viscosity thermoplastic polymer component forms a discontinuous phase. The high viscosity polymeric component can exist in many forms, for example, it need not totally melt and, hence, might exist as an agglomerate; it might be partially soluble or insoluble with the low viscosity component; or it might even be reacted with the low viscosity component. The difference between viscosities of the high viscosity component, or at least one of the higher viscosity components when two or more such components exist, to the low viscosity component, is generally a ratio of at least 1.5 or 2.0, desirably at least 3.0, and more desirably at least 5.0, and preferably at least 8.0 or 10.0, or even at least 50, at a given processing temperature under generally high shear processing conditions. Although an upper limit is not always necessary, the upper ratio can be 1,000, or less. Thus, suitable viscosity ranges include any of the above values. Such effective viscosity differences at the processing temperature, along with high shear, contribute to the incorporation of the fibers within the thermoplastic molding compositions and result in a molded article having exceptionally smooth surfaces substantially or essentially and usually completely free of fibers, i.e., at least 95 percent, desirably at least 99 percent, and preferably at least 99.5 percent fiber-free by weight, and usually completely fiber-free.

The end product or article typically has a surface layer which is generally rich in, enriched of, if not entirely composed of, the low viscosity component. The surface layer of the thermoplastic molded article, as noted above, is generally substantially free of fibers with the incorporated fibers thus being located within the interior portion, i.e., below the surface layer, of the molded article. The thickness of the fiber-free surface layer will depend upon the molding conditions, but generally can vary from about 0.5 mils up to about 8-10 mils, or even greater, and usually from about 1.0, 2.0 or 3.0 mils to about 5.0 or 7.0 mils. The mechanism by which the fibers are incorporated within the immiscible components is not fully understood. Nor is it fully understood if a majority of the fibers is incorporated in the relatively high viscosity component(s), the low viscosity component, or both, but it is generally thought that the fibers are located in all of the thermoplastic components. In any event, the interior portion of the thermoplastic molded article is generally a two-phase portion containing the two immiscible thermoplastic polymer components and the fibers, although it may contain three or more phases if three or more thermoplastic polymeric components are utilized with the fibers.

It has been unexpectedly found that when articles or end products of the immiscible thermoplastic polymer components desirably having different viscosities at the processing temperature when blended under high shear conditions have fibers incorporated within the interior portion of the article, blend, etc. such that the surface layer is exceptionally smooth. While not fully understood, the utilization of moderate and preferably high shear, desirably coupled with relative viscosity differences of the immiscible thermoplastic polymer components at the processing temperature to form a thermoplastic molded article, product, etc., unexpectedly yields an article or product having a very smooth surface. The surface smoothness can be measured by a Surtronic Roughness Meter, Model 10, manufactured by Taylor-Hobson. The compositions or blends of the present invention have surface smoothness values of generally 1.0 or 0.9 microns or less, 0.7 microns or less, desirably 0.5 microns or less, preferably 0.4 microns or less, and most preferably 0.3 or 0.02 microns or less are readily obtained. Another advantage of the molding compositions of the present invention is that certain molds which have irregular shapes, cavities, nooks, and the like, are readily filled, often because the low viscosity component tends to promote flow.

A requirement of the immiscible thermoplastic components is that they have minimal, and desirably, no degradation at the suitable or mean processing temperature. Stated differently, the suitable or typical processing temperature is generally below the degradation temperature of all of the polymeric components forming the molding composition. In a TPU/PET system, however, the processing temperature is actually above the degradation temperature of the TPU. Another important requirement is that the various immiscible thermoplastic components, when blended and especially when molded, are mechanically compatible with each other in that they have good adhesion with respect to one another and to the fibers incorporated therein. Good adhesion is obtained when good physical properties, such as high stiffness and high heat deflection, are achieved.

In general, the molding compositions of the present invention have very good overall physical properties such as high impact resistance, high tensile modulus, high flexural modulus, excellent smoothness, very little, if any, shrinkage upon molding, and the like.

The polymers utilized in the present invention which typically meet the above requisites are generally true polymers, that is a large molecule built up by the repetition of small, simple chemical units. In other words, the various polymers utilized can be conventional thermoplastic polymers having conventional molecular weights known to the art as well to the literature as opposed to simple molecules such as oligomers, lubricants, waxes, nucleating agents, and the like. A preferred class of one of the immiscible thermoplastic polymer components are the various thermoplastic polyurethanes described hereinbelow with the second immiscible polymer component being polyethylene terephthalate (PET), polyethylene terephthalate glycol (PETG), polycarbonate, polyacetal, and acrylonitrile-butadiene-styrene type copolymers encompassed by the term "ABS". From an overall standpoint, numerous blends of generally two, or more, thermoplastic polymer components can be utilized such as thermoplastic polyurethane, polyethylene terephthalate (PET), polyethylene terephthalate-glycol (PETG), polyacetal, polycarbonate, polyvinyl chloride (PVC), copolymers of acrylonitrile-butadiene-styrene (ABS), copolymers of esters and ethers, copolymers of styrene and acrylonitrile (SAN), various polyacrylates, poly(phenylene ether), e.g. (PPO), polysulfones, polybutylene, polyethylene, polypropylene, polystyrene, and the like. Generally, any of at least two of the above-noted types of polymers can be utilized to provide fiber-reinforced thermoplastic molding compositions of the present invention as long as the two, or more, different thermoplastic polymers generally have a dissimilar viscosity at the processing temperature, are molded under high shear conditions, yield at least a two-phase composition, are not subject to degradation, and have good adhesion with respect to one another. A more detailed description of the above thermoplastic polymers is now set forth.

Thermoplastic polyurethanes form a desired and often a preferred class of polymers. Suitable polyurethanes are prepared by reacting a polyisocyanate and one or more chain extenders with an intermediate such as a hydroxyl terminated polyester, a hydroxyl terminated polyether, a hydroxyl terminated polycarbonate (i.e., a polycarbonate polyol), or mixtures thereof, or amine terminated polyesters, polyethers, or polycarbonates, or mixtures thereof.

A preferred class of hydroxyl terminated polyester intermediates is generally a linear polyester having a molecular weight of from about 500 to about 10,000, desirably from about 700 to about 5,000, and preferably from about 700 to about 4,200, and an acid number generally less than 0.8 and preferably less than 0.5. The molecular weight is determined by assay of the hydroxyl groups. The polyester intermediates are produced by (1) an esterification reaction of one or more glycols with one or more dicarboxylic acids or anhydrides, or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups.

The dicarboxylic acids can be aliphatic, cycloaliphatic, aromatic, or combinations thereof. Suitable dicarboxylic acids which may be used alone or in mixtures usually have a total of from 4 to 15 carbon atoms and include: succinic, glutaric, adipic, pimelic, suberic, azelaic, sebacic, dodecanoic, isophthalic, terephthalic cyclohexane dicarboxylic, and the like. Anhydrides of the above dicarboxylic acids, such as phthalic anhydride, tetrahydrophthalic anhydride, or the like, can also be utilized, with adipic acid being preferred.

The ester-forming glycols can be aliphatic, aromatic, or combinations thereof; have a total of from 2 to 12 carbon atoms; and include: ethylene glycol, propylene-1,2-glycol, 1,3-propanediol, butylene-1,3-glycol, 1,4-butanediol, 1,5-pentanediol, 1,6-hexanediol, 2,2-dimethylpropane-1,3-diol, 1,4-cyclohexanedimethanol, decamethylene glycol, dodecamethylene glycol, and the like, with 1,4-butanediol being a preferred glycol.

The above-described polyester intermediates are generally soft and often utilized in forming elastomer type thermoplastic polyurethanes. In addition to the above polyester intermediates, numerous other types of polyester intermediates known to the art and to the literatures can be utilized including those having different molecular weights and/or contain branch polyesters therein. Such other polyester intermediates naturally include polyesters which form a plastic type polyurethane thermoplastic.

It is noted that suitable polycarbonate polyols can also be utilized as an intermediate, and the same, as well as methods of preparation thereof, are disclosed in U.S. Pat. No. 4,643,949, which is hereby fully incorporated by reference. Other low molecular weight polycarbonate polyol intermediates can also be made from diols such as those set forth hereinabove, including 1,6-hexanediol, and the like, and phosgene; or by transesterification with low molecular weight carbonates such as diethyl or diphenyl carbonate.

The hydroxyl terminated polyethers can be polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or propylene oxide, or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(propylene-ethylene glycol) comprising propylene oxide and ethylene oxide reacted with propylene glycol, poly (tetramethylene ether glycol) comprising water reacted with tetrahydrofuran (PTMEG), glycerol adduct comprising glycerol reacted with propylene oxide, trimethylolpropane adduct comprising trimethylolpropane reacted with propylene oxide, pentaerythritol adduct comprising pentaerythritol reacted with propylene oxide, and similar hydroxyl functional polyethers. Polyether polyols further include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. The various polyether intermediates generally have an average molecular weight, as determined by assay of the terminal functional groups, of from about 500 to about 10,000, desirably from about 500 to about 6,000, more desirably from about 500 to about 4,000, and preferably from about 700 to about 3,000.

In addition to the above polyether type intermediates, other intermediates can be utilized known to those skilled in the art as well as to the literature such as those having different molecular weights, made from different reactants, and the like.

The intermediate, such as a hydroxyl terminated polyester, a polyether, etc., is further reacted with one or more polyisocyanates and preferably a diisocyanate along with an extender glycol, desirably in a "one-shot" process, that is, a simultaneous coreaction of the intermediate, diisocyanate, and extender glycol, to produce a moderate molecular weight linear polyurethane having a melt index of from about 0 to about 150 and preferably from about 0 to about 75 at 230° C. at 2,160 grams. The equivalent amount of diisocyanates to the total amount of hydroxyl and/or amine-containing components, that is, the hydroxyl or amine terminated polyester, polyether, etc., and chain extender glycol, is from about 0.95 to about 1.12 or even 1.20, and desirably from about 0.98 to about 1.06. Alternatively, the urethane can be made in a conventional two-step process wherein initially a prepolymer is made from the polyisocyanate and the intermediate, with the prepolymer subsequently being reacted with the chain extender glycol. The equivalent ratio of the one or more diisocyanates to the hydroxyl or amine terminated intermediate is generally a sufficient amount such that upon subsequent chain extension with a suitable glycol, the overall equivalent ratio of the hydroxyl or amine terminated compounds to the one or more polyisocyanates is approximately 0.95 to about 1.06, and the like. Often it can be an excess such as up to about 1.20 or less, or 1.15 or less. Suitable diisocyanates include non-hindered aromatic diisocyanates such as: 4,4'-methylenebis-(phenyl isocyanate) (MDI); isophorone diisocyanate (IPDI), m-xylylene diisocyanate (XDI), as well as non-hindered cyclic aliphatic diisocyanates such as 1,4-cyclohexyl diisocyanate (CHDI), decane-1,10-diisocyanate, phenylene-1,4-diisocyanate, naphthylene-1,5-diisocyanate, diphenylmethane-3,3'-dimethoxy-4,4'-diisocyanate, dicyclohexylmethane-4,4'-diisocyanate, and cyclohexyl-1,4-diisocyanate, as well as combinations thereof. The most preferred non-hindered diisocyanate is 4,4'-methylenebis-(phenyl isocyanate) i.e., MDI.

Suitable extender glycols (i.e., chain extenders) are lower aliphatic or short-chain glycols having from about 2 to about 10 carbon atoms and include, for instance, ethylene glycol, diethylene glycol, propylene glycol, dipropylene glycol, 1,4- butane diol, 1,6-hexane diol, 1,3-butane diol, 1,5-pentane diol, 1,4-cyclohexanedimethanol, hydroquinone di(hydroxyethyl)ether, and the like, as well as combinations thereof, with 1,4-butane diol being preferred.

In the one-shot polymerization process, a simultaneous reaction occurs between three components: one or more polyol prepolymers, polyisocyanate, and extender glycol. The reaction is generally initiated at temperatures above 100° C. and desirably above 120° C. Inasmuch as the reaction is exothermic, the reaction temperature generally increases to about 200° C. to 280° C. Similar reaction temperatures are utilized when the polyurethane is made in a two-step process.

Examples of the above, as well as other suitable thermoplastic polyurethanes which can be utilized, are set forth in Vol. 13 of the *Encyclopedia of Polymer Science and Engineering*, John Wiley & Sons, Inc., New York, N.Y., 1988, pages 243-303, which is hereby fully incorporated by reference.

Another specific thermoplastic component which can be utilized is polyethylene terephthalate (PET), known to the art and to the literature, and generally made from the reaction product of ethylene glycol and dimethyl terephthalate or by direct esterification between ethylene glycol and terephthalic acid under heat and a high vacuum. Moreover, PETG polymers can also be utilized, as known to the art and to the literature, and generally are the reaction products of ethylene glycol, a short-chain glycol other than ethylene glycol, and dimethyl terephthalate or terephthalic acid. Examples of other polyesters which can be utilized are set forth in *Encyclopedia of Polymer Science and Engineering*, Vol. 12, John Wiley & Sons, Inc., New York, N.Y., 1988, pages 217-256, which is hereby fully incorporated by reference.

Another useful class of thermoplastic polymers are polyacetals, i.e., polyoxymethylene, including homopolymers or copolymers thereof which are known to the art and to the literature. Inasmuch as the homopolymer, which is usually made from formaldehyde, must generally be processed at temperatures below about 185° F., copolymers are generally utilized because they have better processing characteristics. Acetal copolymers are made by a reaction between trioxane, a trimer of formaldehyde, and another monomer such as formaldehyde. An example of a commercially available polyacetal copolymer is Celcon, made by Celanese Chemical Company. These and examples of other polyacetals which can be utilized are set forth in the *Encyclopedia of Polymer Science and Engineering*, Vol. 11, John Wiley & Sons, Inc., New York, N.Y., 1988, page 286, which is hereby fully incorporated by reference, as well as in U.S. Pat. Nos. 3,850,873 and 4,017,558, which are also fully incorporated by reference.

Another thermoplastic component is the various polycarbonates, including those which are known to the art and to the literature. Polycarbonates are generally esters derived from a diol, or preferably a dihydric or polyhydric phenol such as bisphenol A, and carbonic acid, phosgene, and the like. Polycarbonates generally have a repeating carbonate group, i.e.,

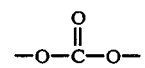

and generally always have a

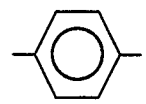

radical attached to the carbonate group. Polycarbonates are well known and described in many patents and other technical references. Desirably, the polycarbonate can be characterized by the formula

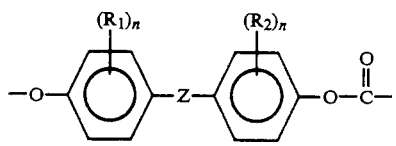

wherein Z is a single bond, an alkylene or alkylidene radical with 1 to 7 carbon atoms, a cycloalkylene or cycloalkylidene radical with 5 to 12 carbon atoms, —O—, —CO—, —SO or SO$_2$—, preferably methylene or isopropylidene; R$^1$ and R$^2$ are hydrogen, halogen or an alkylene or alkylidene radical having 1 to 7 carbon atoms; and n equals 0 to 4. Most preferably, the aromatic polycarbonates useful in the practice of the invention have a melt flow rate range of about 1 to 60 gms/10 min. at 300° C., as measured by ASTM D-1238. The most important aromatic polycarbonate which is commercially available from many different sources is the polycarbonate of bis(4-hydroxyphenyl)-2,2-propane, known as bisphenol-A polycarbonate. These and examples of other polycarbonates which can be utilized are set forth in the *Encyclopedia of Polymer Science and Engineering*, Vol. 11, John Wiley & Sons, Inc., New York, N.Y., 1988, pages 648–718, which is hereby fully incorporated by reference.

Other thermoplastic polymers suitable for use in the present invention are the various ABS type copolymers which are known in the art and to the literature. Such polymers are generally graft copolymers of acrylonitrile, conjugated dienes having from 4 to 8 carbon atoms with butadiene being highly preferred, and a vinyl substituted aromatic having from 8 to about 12 carbon atoms, with styrene being preferred, often referred to as an acrylonitrile-butadiene-styrene copolymer. The amount of the acrylonitrile is generally from about 10 to about 40 percent by weight; the amount of styrene is generally from about 20 to about 70 percent by weight; and the amount of butadiene is generally from about 20 to about 60 percent by weight based upon the total weight of the three-component mixture. Although ABS copolymers are generally a mixture of a styrene-acrylonitrile copolymer and a styrene-acrylonitrile grafted polybutadiene rubber, a terpolymer made from acrylonitrile, butadiene, and styrene monomers can also be used. In lieu of butadiene, other conjugated dienes such as isoprene, pentadiene, dimethylbutadiene, dimethyl pentadiene, and the like can also be utilized. Similarly, in lieu of styrene, vinyl toluene, alpha methyl vinyl toluene, alpha methyl styrene, and the like can be utilized. Although acrylonitrile is normally always utilized, other vinyl cyanides can be utilized such as methacrylonitrile, ethacrylonitrile, and the like. These and examples of other ABS type polymers which can be utilized are set forth in the *Encyclopedia of Polymer Science and Engineering*, Vol. 1, John Wiley & Sons, Inc., New York, N.Y., 1985, pages 388–426, which is hereby fully incorporated by reference.

Another thermoplastic polymer component which can be utilized in the present invention is polyvinyl chloride and the various copolymers thereof which are known to the art and to the literature. Polyvinyl chloride copolymers are generally made from a majority of vinyl chloride monomers and a vinyl component monomer. By the term "vinyl component," it is meant a vinyl-type monomer other than vinyl chloride. Such monomers are well known to the art and to the literature and include esters of acrylic acid wherein the ester portion has from 1 to 12 carbon atoms, for example, methyl acrylate, ethyl acrylate, butyl acrylate, octyl acrylate, cyanoethyl acrylate, and the like; vinyl acetate; esters of methacrylic acid wherein the ester portion has from 1 to 12 carbon atoms, such as methyl methacrylate, ethyl methacrylate, butyl methacrylate, and the like; styrene and styrene derivatives having a total of from 8 to 15 carbon atoms such as alpha methyl styrene, vinyl toluene, chlorostyrene; vinyl; naphthalene; diolefins having a total of from 4 to 8 carbon atoms such as butadiene, isoprene, and including halogenated diolefins such as chloroprene; monoolefins having from 2 to 10 carbon atoms and preferably 2 to 4 carbon atoms; and the like, and mixtures thereof. An amount of vinyl chloride monomer is utilized to produce a copolymer containing at least about 70 percent by weight, and preferably from about 80 to about 93 percent by weight of vinyl chloride repeating units therein. The remainder of the copolymer is made up of the one or more above-noted vinyl component monomers, for example, vinyl acetate. Thus, an amount of vinyl component monomer, when utilized to produce a copolymer, is from up to about 30 percent and preferably from about 7 to about 20 percent by weight of vinyl component repeating units therein. Also included within the definition of the polyvinyl chloride type polymers and copolymers as set forth above are chlorinated polyvinyl chloride polymers (CPVC) and copolymers having a total chlorine content of from about 57 to about 72 percent by weight. These and examples of other polyvinyl chloride type polymers and copolymers which can be utilized are set forth in the *Encyclopedia of Polymer Science and Engineering*, Vol. 17, John Wiley & Sons, Inc., New York, N.Y., 1989, pages 295–376, which is hereby fully incorporated by reference.

Another thermoplastic polymer component which can be utilized in the present invention is a polyester-ether polymer which in reality is a copolyetherester block copolymer generally comprising one or more ring containing polyester blocks as well as one or more acyclic polyether blocks. The polyester block is generally made from an aromatic containing dicarboxylic acid or diester such as terephthalic acid, dimethyl terephthalate, and the like, with a diol generally containing from about 2 to about 10 carbon atoms. The acyclic polyether is generally made from polyalkylene oxide glycols having a total of from about 3 to about 12 atoms including up to about 3 or 4 oxygen atoms with remaining atoms being hydrocarbon atoms. The polyester-ether polymers can be represented by the following formula:

(ring containing polyester-b-acyclic polyether)$_n$.

Such polyester-ether copolymers are commercially available such as Hytrel, manufactured by DuPont, and the like, with polybutyleneterephthalate-b-poly(oxytetramethylene) block copolymer being preferred. These and other examples of other polyester-ether copolymers which can be utilized are set forth in the *Encyclopedia of Polymer Science and Engineering*, Vol. 12, John Wiley & Sons, Inc., NY, N.Y., 1988, pages 49–52, which is hereby fully incorporated by reference as well as U.S. Pat. Nos. 2,623,031; 3,651,014; 3,763,109; and 3,896,078.

Another thermoplastic polymer component which can be utilized in the present invention is copolymers of generally styrene and acrylonitrile, typically known as SAN, that is, styrene-acrylonitrile copolymers. Such copolymers can generally be produced by either emulsion, suspension, or continuous mass polymerization, and usually are made from a majority, by weight, of styrene monomers. Comonomers other than styrene which can be utilized include vinyl acetate, methyl acrylate, and vinyl chloride. These and a further detailed description of SAN-type polymers in general are set forth in the *Encyclopedia of Polymer Science and Engineering,* Vol. 1, John Wiley & Sons, Inc., New York, N.Y., 1985, pages 452–470, which is hereby fully incorporated by reference.

Another thermoplastic polymer component which can be utilized in the present invention are the various esters of acrylic or methacrylic acid where the ester portion is typically an alkyl containing from 1 to about 16 carbon atoms, a secondary branched-chain alkyl ester containing from 3 to about 10 carbon atoms, an ester of an olefinic alcohol containing from 3 to about 8 carbon atoms, an aminoalkyl ester containing from about 3 to about 10 carbon atoms, an ester of ether alcohols containing from about 2 to about 10 carbon atoms, a cycloalkyl ester containing from about 4 to about 12 carbon atoms, or a glycol diacrylate containing from about 2 to about 10 carbon atoms, and the like. Very often, copolymers of various acrylates and blends thereof can be utilized. Examples of common, commercially available, acrylates include methyl acrylate, ethyl acrylate, n-butyl acrylate, isobutyl acrylate, 2-ethylhexyl acrylate, and the like. Examples of the various methacrylates include methyl methacrylate, ethyl methacrylate, n-butyl methacrylate, isodecyl methacrylate, stearyl methacrylate, and the like. These and examples of other acrylate or methacrylate esters which can be utilized are set forth in the *Encyclopedia of Polymer Science and Engineering,* Vol. 1, John Wiley & Sons, Inc., New York, N.Y., 1985, pages 234–325, which is hereby fully incorporated by reference.

Another thermoplastic which can be utilized in the present invention is poly(phenylene ether). The most important polymer which can be utilized is poly(2,6-dimethyl-1,4-phenylene ether). Other polymers include poly(2,6-diphenyl-1,4-phenylene ether), poly(2-methyl-6-phenylphenol, as well as copolymers of 2,6-dimethylphenol and 2,6-diphenylphenol. Blends of polystyrene with poly(phenylene ether) can also be utilized. These and examples of other poly(phenylene ether) compounds which can be utilized are set forth in the *Encyclopedia of Polymer Science and Engineering,* Vol. 13, John Wiley & Sons, Inc., NY, N.Y., 1988, pages 1 through 30, which is hereby fully incorporated by reference.

The polysulfones constitute yet another class of thermoplastic polymer components which can be utilized in the present invention. Polysulfones are generally classified as high molecular weight polymers containing sulfone groups and aromatic nuclei in the main polymer chain. The term "polysulfone" also denotes a class of polymers prepared by radical-induced copolymerization of olefins and sulfur dioxide. Polysulfones are generally clear, rigid, tough thermoplastics with generally high glass transition temperatures, i.e., 180° C. to about 250° C., with a chain rigidity generally being derived from the relatively inflexible and immobile phenyl and $SO_2$ groups. Examples of various polysulfones include bisphenol A polysulfone, polyarylethersulfone, polyethersulfone, polyphenylsulfone, and the like. These and other examples of polysulfones which can be utilized in the present invention are set forth in the *Encyclopedia of Polymer Science and Engineering,* Vol. 13, John Wiley & Sons, Inc., New York, N.Y., 1988, pages 196–211, which is hereby fully incorporated by reference.

The various polybutylene polymers can also be utilized in the present invention and are derived essentially from high molecular weight, predominantly isotactic poly(1-butene) homopolymers or copolymers. These as well as other examples of various polybutylene polymers which can be utilized in the present invention are set forth in the *Encyclopedia of Polymer Science and Engineering,* Vol. 2, John Wiley & Sons, Inc., New York, N.Y., 1985, pages 590–605, which is hereby fully incorporated by reference.

Polyethylene, and the various forms thereof, constitutes another class of thermoplastic copolymers which can be utilized with another thermoplastic copolymer which is immiscible therewith and, at a specific processing temperature, has a different viscosity therefrom. Examples of various types of polyethylene include linear polyethylene such as ultra low density polyethylene, linear low density polyethylene, high density polyethylene, high molecular weight high density polyethylene, ultra high molecular weight polyethylene, and the various types of branched polyethylenes such as low density polyethylene, and the like. These and examples of other polyethylene polymers which can be utilized are set forth in the *Encyclopedia of Polymer Science and Engineering,* Vol. 6, John Wiley & Sons, Inc., New York, N.Y., 1986, pages 383–522, which is hereby fully incorporated by reference.

Still another type or class of thermoplastic polymer component which can be utilized in the present invention is the various polypropylene polymers, such as isotactic polypropylene and the like. It is to be understood that within the classification of polypropylene polymers and polyethylene polymers are the various copolymers of ethylene and propylene. A description of various polypropylene polymers can be found in the *Encyclopedia of Polymer Science and Engineering,* Vol. 13, John Wiley & Sons, Inc., New York, N.Y., 1988, pages 464–531, which is hereby fully incorporated by reference.

Another thermoplastic polymer component suitable for use in the present invention is polystyrene, including crystal polystyrene, impact polystyrene, and the like. Such polymers are known to the art, and examples thereof suitable for use in the present invention are set forth in the *Encyclopedia of Polymer Science and Engineering,* Vol. 16, John Wiley & Sons, Inc., New York, N.Y., 1989, pages 1–246, which is hereby fully incorporated by reference.

In accordance with the present invention, desirably two, or more, of the above-noted types of thermoplastic polymer components are selected, which, as noted previously, are generally immiscible with respect to one another, have relatively different viscosities at a specific processing temperature, and generally do not degrade at the processing temperature, are blended under high shear to yield a two-phase or multiple-phase composition having fibers incorporated therein and wherein the two, or more, different thermoplastic polymers have good mechanical compatibility to every component, that is, mutually good adhesive properties with respect to each component. Unexpectedly, an extremely smooth surface layer is produced which is substantially and typically free of fibers. Although a large number of combinations of various specific thermoplastic polymers exist, desirable combinations according to the above guidelines can be readily determined by one skilled in the art. Thus, fiber reinforced blends of polyvinyl chloride (including chlorinated polyvinyl chloride) and polycarbonate can be utilized, fiber reinforced blends of polyvinyl chloride (including chlorinated polyvinyl chloride) and ABS type copolymers can be utilized, as well as fiber reinforced blends, as noted above, wherein one component is polyurethane, and the second component is PET, PETG, polycarbonate, polyacetal, or an ABS copolymer. Even though two component systems are generally preferred, the present invention also encompasses multi-component compositions having three or more of the above-noted thermoplastic polymer components which are blended under high shear in the presence of fibers. The amount of any thermoplastic polymer component with respect to an immiscible thermoplastic polymer component in a two-component thermoplastic blend according to the preferred embodiment of the present invention is from about 15 percent to about 85 percent by weight, desirably from about 25 to about 75 percent by weight, and preferably from about 40 percent to about 60 percent by weight with the remaining component constituting the difference. When more than two thermoplastic polymer components are utilized, the amount of one of the thermoplastic polymer components is within the above ranges with the remaining two or more thermoplastic components constituting the difference, i.e. the total of all components add up to 100 percent by weight. Desirably, the remaining two or more components each exist in amounts of at least 15 percent, and desirably at least 20 percent or 25 percent by weight.

In accordance with the present invention, short fibers are added to the thermoplastic immiscible polymer components to provide a fiber-reinforced molding composition. The types of organic fibers which can be utilized are limited to those which generally do not melt during blending of the thermoplastic polymer components of the present invention. Examples of such organic fibers include aramid, that is aromatic polyamide fibers, and various aramid hybrides such as aramid/carbon, aramid/carbon/glass, and aramid/glass composites. Generally, any type of inorganic fiber can be utilized including those known to the art and to the literature such as glass fibers. Glass fibers, either unsized or, preferably, sized, and particularly chopped, i.e., short, glass fibers in lengths of about one-eighth inch to two inches, are preferred where an average length of one-eighth to one-half inch fiber is most preferred. Due to the shear mixing with the matrix polymers, especially the viscous immiscible polymer, a majority of the short fibers are broken or sheared into shorter fibers whereby said sheared fibers are typically reduced in size to about 0.2 to about 3 millimeters in length. A common glass fiber which can be utilized is "E" type glass fiber which is substantially free of alkali metal salts and has a tensile strength of about 500,000 psi, a modulus of elasticity of around 10.5 million psi, and a fiber diameter between about 0.0001 and 0.001 inch. Continuous glass roving can also be utilized and subsequently chopped to a desired length. Smaller glass fibers, known as "S" milled fibers, are also commercially available, although the size range is smaller and more narrow, typically between 1/32 and ⅛ inch in length. Other suitable inorganic fibers include carbon fibers, carbon/glass hybrid fibers, boron fibers, graphite fibers, and the like. Various ceramic fibers can also be utilized such as alumina-silica fibers, alumina fibers, silicon carbide fibers, and the like, as well as various metallic fibers such as aluminum fibers, nickel fibers, steel, e.g. stainless steel fibers, and the like. The length of the non-glass fibers is generally the same as the glass fibers and hence initially can be from about ⅛ inch to about 2 inches in length and more desirably have an average length of from about ⅛ to about ½ inch before shear blending with the various thermoplastic polymer components. The fibers are combined with the two, or more, thermoplastic polymer components on a weight basis of from about 5 percent to about 60 percent, desirably from about 15 percent to about 50 percent, and preferably from about 25 percent to about 45 percent by weight based upon the total weight of the immiscible thermoplastic polymer components and the fibers.

The fiber-reinforced thermoplastic molding composition blend, etc., is made by initially compounding the various ingredients and making them into a suitable form or shape for storage and subsequent use, and then processing the same at a suitable temperature to form a molded article or end product. The compounding step generally entails adding the two, or more, immiscible thermoplastic components which are utilized as well as the fibers to a mixing or blending apparatus having at least moderate shear, such as a Banbury, a twin-screw extruder, a Buss Kneader, or the like, and mixing the same until generally a two-phase, or a multiple phase, blend having fibers incorporated therein is obtained. The mixing temperature is approximately the same as the processing temperature of the molding operation, although it can be higher or lower, e.g., by 10° F. or even 20° F. In order to prevent the various fibers from undue breakage, which reduces the physical properties of the molded end product, or composition, the fibers are generally added after a melt is developed in the blending apparatus, as toward the end of the compounding process. Shear mixing is continued until the various components are generally dispersed, and overmixing is avoided because it tends to reduce the fibers to an undesirable short length. The resulting mixture or blend of thermoplastic polymer components and fibers is generally cooled to produce a solid mass and then pelletized or otherwise divided into suitable size particles for use in a molding apparatus used to form the final product or composition, i.e. article.

On an optional basis, minor amounts of other molding additives can be intermixed with the immiscible thermoplastic compounded polymers. For instance, mold release agents can be added to obtain a clean release from the mold platen. Opacifying pigments such as titanium dioxide, or filler pigments such as calcium carbonate, talcs, carbon blacks, silicas, clays, and the like, can be added. Colorants such as tinting pigments or organic dyes can be added to provide color to the molded article. Ordinarily such additives, if utilized, comprise less than about 25 percent, desirably less than 15 percent, and preferably less than 10 or 5 percent by weight, of the molding composition based on the weight of matrix polymers plus reinforcing fibers. Other additives, such as up to about 15 percent by weight of Teflon powder, or up to about 2 percent by weight of silicone oil, can be used for compositions for bearings, or up to about 12 percent by weight of stainless steel fibers can be used for conductivity purposes or for shielding against EMR waves.

The compounded immiscible thermoplastic molding compositions containing fibers incorporated therein, as well as the various optional molding additives, as noted above, are generally molded under high shear conditions. That is, the compounding molding step utilizes a moderate to high shear range as from about at least 10, desirably at least 100, desirably at least 500, etc., reciprocal seconds, whereas the actual end product or article formation step such as injection molding generally requires high shear such as a shear rate of at least 100, desirably at least 500, more desirably at least 800, etc., reciprocal seconds. High shear conditions, that is, shear rates of at least 100 reciprocal seconds, are generally required as a practical matter to obtain the unexpectant smooth surface characteristics of the present invention. Any conventional processing device which typically generates the required high shear processing rates can be utilized. Examples include various injection molding machines including those utilizing a plunger or more preferably a reciprocating screw. As long as suitable high shear conditions are generated to produce smooth surface articles or products of the present invention, various injection blow molding machines, and to a lesser extent various compression molding machines, can also be utilized.

The processing temperature will naturally vary depending upon the type of specific different thermoplastic components which are utilized and usually is from about 200° C. to about 300° C. although higher or lower temperatures can be utilized. For example, when a thermoplastic polyurethane is blended with a polycarbonate in the presence of glass fibers, the processing temperature can generally range from about 240° C. to about 260°. C. Blending of PVC with polycarbonate and glass fibers can be molded at temperatures at from about 225° C. to abut 240° C. Yet another example is a blend of a thermoplastic polyurethane, polyacetal, and glass fibers which typically can be blended at temperatures of from about 240° C. to about 255° C. A blend of a thermoplastic urethane, PET, and glass fibers can be blended at temperatures of from about 245° C. to about 265° C.

Once the thermoplastic compositions have been molded in accordance with the various aspects of the present invention, e.g. the high shear blending of immiscible thermoplastic components generally having relative different viscosities at a processing temperature which is below the degradation temperature of the thermoplastic components with fibers, yields a mechanically compatible end product unexpectedly having a smooth surface layer containing essentially one thermoplastic component with an interior portion having two phases and containing the fibers therein, have very high physical properties such as impact resistance, high heat distortion temperatures, high tensile modulus, high flexural modulus, and the like. For example, when a thermoplastic polyurethane is compounded with PET on approximately a 50/50 percent weight basis and the two components contain approximately 25 percent by weight of fiber glass therein, the following physical properties are typical: notched Izod impact resistance of 1.0 ft. lbs./inch or greater, and generally at least 2.0 ft. lbs./inch at room temperature; heat distortion temperatures of at least 200° F. and generally at least 250° F. at 264 psi; a tensile modulus of at least 700,000 psi, generally at least 1,000,000 psi and even at least 1,500,000 psi; and a flexural modulus of at least 700,000 psi, and generally at least 1,000,000 psi, and even at least 1,200,000 psi.

In view of the exceptionally good physical properties such as high stiffness (for example, high tensile modulus and high flexural modulus), high heat distortion temperatures, and excellent melt flow, numerous end uses exist. Moreover, with regard to the exceptionally smooth surface achieved, the same can be maintained, or dulled to provide a low sheen, or altered by texturing the mold surface to provide a pebbled grain or other decorative surface. A particularly desirable end use the molded compositions of the present invention is for housings, fenders, etc., as well as for horizontal surfaces in a vehicle. Thus, the molded article can be an automotive hood, fender, truck, roof, and the like. The molded compositions of the present invention, inasmuch as they can contain surfaces rich in polyurethane, provide excellent paint adhesion with respect to various industrial paint coatings such as polyurethane-based paints, without the need of a primer.

The invention will be better understood by referring to the following illustrative examples.

EXAMPLE 1

Thermoplastic Urethane/Polycarbonate/Glass Fibers

A composite of 35 percent thermoplastic urethane (TPU), i.e., Estane 58137, manufactured by The BFGoodrich Company, which is made from a polyester intermediate utilizing MDI and 1,4-butane diol; 35 percent polycarbonate, i.e., Dow Calibre 300–22; and 30 percent glass fiber was made on a Warner-Pflieder compounding twin-screw extruder. The TPU was characterized by its low viscosity of $7-8 \times 10^2$ poise, on a 20/1, L/D, capillary rheometer at 100 sec$^{-1}$ shear rate and 260° C. The polycarbonate was characterized by its high viscosity of $7-9 \times 10^3$ poise at 260° C. The glass was ¼-inch "E" glass.

The TPU and polycarbonate were dried for 2 hours at 100° C. Then the TPU and polycarbonate were mixed on the Warner-Pflieder compounding twin-screw extruder, adding granules of these materials at the rear port of the extruder. Downstream, after these materials were mixed and heated to about 240° C. glass was added. Work and mixing continued on the compounding extruder. This composite blend at 260° C. was extruded through a spaghetti die, cooled in air, and chopped into pellets.

The pellets were dried 2 hours at 105° C. The injection molding was carried out in a physical property mold. The mold temperature was set at 50° C. The melt temperature achieved was 252° C. The glass-filled TPU and glass-filled polycarbonate were made under the same conditions.

Physical data are set forth in Table I.

TABLE I

| PROPERTIES OF TPU/POLYCARBONATE/GLASS FIBER | | | |
|---|---|---|---|
| | 70% TPU 30% Glass | 35% TPU 35% Polycarbonate 30% Glass | 70% Polycarbonate 30% Glass |
| | | | Would not mold at 252° C. |
| Surface Smoothness, Taylor-Hobson Surtronic 10 Gauge | 0.3 microns | 0.4 microns | 4.5 microns* |
| Tensile Strength, ASTM D638 | 11,700 psi | 15,000 psi | 14,600 psi |

TABLE I-continued
PROPERTIES OF TPU/POLYCARBONATE/GLASS FIBER

|  | 70% TPU<br>30% Glass | 35% TPU<br>35% Polycarbonate<br>30% Glass | 70% Polycarbonate<br>30% Glass |
|---|---|---|---|
| Elongation | 12.6% | 4.3% | 2.3% |
| Tensile Modulus | 520,000 psi | 970,000 psi | 1,080,000 psi |
| Heat Deflection Temperature at 264 psi ASTM D698 annealed at 120° C. | 116° C. | 141° C. | 145° C. |

*The polycarbonate would not mold at 252° C., but plugged the injection sprue. These data are for polycarbonate molded at 271° C.

This example shows the excellent smoothness of the TPU/polycarbonate/glass blend at conditions where the polycarbonate/glass cannot be molded. The blend has a far superior smooth surface finish to the polycarbonate/glass molded at a higher temperature. The physical properties of the 35% TPU/35% PC/30% glass blend are also similar to the 70% PC/30% glass blend. Tensile strength is superior, and the tensile modulus and heat deflection temperature approach the properties of the PC/glass blend.

The combination of properties is unique and unexpected with surface and melt flow similar to the lower viscosity TPU/glass composite and the physical properties closer to the higher viscosity PC/glass composite.

EXAMPLE 2

Vinyl/Polycarbonate/Glass Fiber

A composite of 35 percent vinyl compound, i.e., Geon 87241, a polyvinyl chloride compound manufactured by The BFGoodrich Company; 35 percent polycarbonate, i.e., Dow Calibre 300–22; and 30 percent glass fiber was made on a Warner-Pflieder compounding twin-screw extruder. The vinyl was characterized by its low viscosity of $2-4 \times 10^3$ poise, on a 20/1, L/D, capillary rheometer at 100 sec$^{-1}$ shear rate and 230° C. The polycarbonate is characterized by its high viscosity of $3-5 \times 10^4$ poise at 230° C. The glass fibers were ¼-inch "E" glass.

The polycarbonate was dried for 2 hours at 100° C.; the vinyl was not dried further. The vinyl and polycarbonate were then mixed on the Warner-Pflieder compounding twin-screw extruder, adding granules of these materials at the rear port of the extruder. Downstream, glass fibers were added. Working and mixing continued on the compounding extruder At 237° C. this composite blend was extruded through a spaghetti die, cooled in air, and chopped into pellets.

A vinyl/glass fiber, at a 70:30 weight ratio, was produced under similar conditions. A polycarbonate/glass fiber control, 70:30 weight ratio, was produced under similar conditions except the melt temperature at the die was 277° C.

The pellets were dried 2 hours at 105° C. The injection molding was carried out in a physical property mold at a temperature of 50° C. The melt temperature was 229° C.

A control compound of vinyl/glass, 70:30 weight ratio, was made under the same conditions. A control compound of polycarbonate/glass, 70:30 weight ratio, was made at 271° C. in a compounding extruder.

Physical data are set forth in Table II.

TABLE II
PROPERTIES OF VINYL/POLYCARBONATE/GLASS FIBERS

|  | 70% Vinyl<br>30% Glass | 35% Vinyl<br>30% Glass<br>35% Polycarbonate | 70% Polycarbonate<br>30% Glass |
|---|---|---|---|
|  |  |  | Would not mold at 229° C. |
| Surface Smoothness, Taylor-Hobson Surtronic 10 Gauge | 0.6 microns | 0.7 microns | 4.5 microns* |
| Tensile Strength, ASTM D638 | 12,800 psi | 13,300 psi | 14,600 psi |
| Elongation | 1.6% | 1.3% | 2.6% |
| Tensile Modulus | 1,760,000 psi | 2,000,000 psi | 1,080,000 psi |
| Heat Deflection Temperature @ 264 psi ASTM D698 Annealed at 93° C. | 82° C. | 117° C. | 145° C. |

*The polycarbonate (PC) would not mold at 229° C., but plugged the injection sprue. These data are for polycarbonate molded at 271° C.

These data show that vinyl/polycarbonate/glass blend gives a good surface at conditions where the polycarbonate/glass cannot be molded. The blend has a much superior smooth surface finish to polycarbonate/glass molded at a higher temperature.

The physical properties of the vinyl/PC/glass blend are unexpectedly higher in modulus than either the vinyl/glass blend or the PC/glass blend and the heat deflection temperature is higher than the mean heat deflection temperature of vinyl/glass and PC/glass.

The combination of properties is unique with surface and melt flow similar to the lower viscosity vinyl/glass composite and the physical properties closer to the PC/glass composite.

EXAMPLE 3

Vinyl/Polycarbonate

A composite of 35 percent vinyl compound, i.e., Geon 87241, a polyvinyl chloride compound manufactured by The BFGoodrich Company; 35 percent polycarbonate, i.e., Dow Calibre 300–22; and 30 percent glass was made on a Buss Kneader rotating-reciprocating compounding machine. The vinyl compound was characterized by its low viscosity $0.5-1.5 \times 10^4$ poise, on a 20/1, L/D capillary rheometer at 100 sec$^{-1}$ shear rate at 210° C. The polycarbonate was characterized by its high viscosity, $0.5-1.5 \times 10^5$ poise, on a 20/1, L/D rheometer at 210° C. The glass was ¼-inch "E" glass.

The vinyl compound and the polycarbonate were mixed on the Buss Kneader. After melting the blend, glass was added through a port on the Buss Kneader and mixed into the blend achieving a compound temperature of 210° C. This compound was injection molded at 210° C. into a cold mold (50° C.) to form a smooth product. The surface roughness was 0.6 microns as measured on a Taylor-Hobson Surtronic 10 roughness gauge. These data show good surface appearance for vinyl/polycarbonate/glass when compounded on a different type compounding machine.

EXAMPLE 4

Vinyl/ABS/Glass

A composite of 35 percent vinyl compound, that is, Geon 87241, a polyvinyl chloride compound manufactured by The BFGoodrich Company; 35 percent ABS, that is, Taitalac 6000, manufactured by Bolcof; and 30 percent glass was made on a Buss Kneader compounding machine. The vinyl is characterized by a melt viscosity of $0.5–1.5 \times 10^4$ poise on a 20/1, L/D capillary rheometer at 210° C. The ABS has only a slightly higher viscosity of $1.8 \times 10^4$ poise. The glass was ¼-inch "E" glass.

The vinyl compound and ABS were mixed on a Buss Kneader compounding machine. After melting the blend, glass was added through a port on the barrel of the Buss Kneader and mixed to a melt temperature of 207° C.

This compound was injection molded at 210° C. into a cold mold (50° C.) to form a plaque with a surface roughness of 0.7 microns as measured on a Taylor-Hobson Surtronic 10 roughness gauge. These data show good surface smoothness for vinyl/ABS/glass when compounded on a different type compounding machine.

EXAMPLE 5

Thermoplastic Urethane/Polyacetal/Glass

A composite of 53 percent polyurethane (Estane 58137), 17 percent polyacetal (Delrin 900), and 30 percent glass fibers was made on a Warner-Pflieder compounding twin-screw extruder. The glass was ¼-inch chopped "E" glass.

The TPU and polyacetal were dried two hours at 100° C. Then the TPU and polyacetal were mixed on the warner-Pflieder compounding twin-screw extruder, adding granules of these materials at the rear extruder port. Downstream, after these materials were mixed and heated to about 240° C., glass was added. Work and mixing were continued on the compounding extruder. This composite blend was extruded through a spaghetti die at about 260° C., cooled and chopped into pellets.

The pellets were dried 4 hours at 105° C. The injection molding was carried out in a physical property mold. The mold temperature was set at 45° C. The melt temperature achieved was 250° C.

Physical data are set forth in Table III.

TABLE III

| PHYSICAL PROPERTIES OF TPU/POLYACETAL/GLASS | |
|---|---|
| Surface Smoothness, Taylor-Hobson Surtronic 10 Gauge | 0.2 microns |
| Tensile Strength, ASTM D638 | 7800 psi |
| Elongation | 8.5% |
| Tensile Modulus | 560,000 psi |
| Flexural Strength, ASTM D790 | 14,700 psi |
| Flexural Modulus | 580,000 psi |
| Vicat softening, ASTM D1525B | 159° C. |
| Heat Deflection Temperature @ 264 psi, ASTM D698 Annealed at 120° C. | 135° C. |
| Izod impact, ASTM D638 | |
| Unnotched | 17.7 ft. lbs/in |
| Notched | 2.1 ft. lbs/in |

This data shows the ability to have an outstandingly smooth surface with 30 percent glass in this TPU/polyacetal blend and include generally good physical properties.

EXAMPLE 6

Thermoplastic Urethane/Polyethylene Terephthalate/Glass

A composite of 35 percent thermoplastic urethane (Estane 58137), 35 percent polyethylene terephthalate (recycled bottle resin), and 30 percent glass fiber was made on a laboratory-size Warner-Pflieder compounding twin-screw extruder. The TPU was characterized by its low viscosity of $7–8 \times 10^2$ poise, measured on a 20/1, L/D capillary rheometer at 100 sec$^{-1}$ shear rate and 260° C. The PET was characterized by its high viscosity of $6–15 \times 10^3$ poise, measured on a 20/1, L/D capillary rheometer at 100 sec$^{-1}$ shear rate and 260° C. The glass was ¼-inch chopped "E" glass.

The TPU and PET were dried for 2 hours at 100° C. Then the TPU and PET were mixed on a Warner-Pflieder compounding twin-screw extruder, adding granules of these materials at the rear extruder port. Downstream, after these materials were mixed and heated to about 240° C., glass was added Work and mixing were continued on the compounding extruder At 260° C., this composite blend was extruded through a spaghetti die, cooled in air, and chopped into pellets.

The pellets were dried 2 hours at 105° C. The injection molding was carried out in a physical property mold. The mold temperature was set at 45° C. The melt temperature achieved was 250° C. The glass-filled thermoplastic urethane and glass-filled PET were made under these same conditions.

Physical data are set forth in Table IV.

TABLE IV

| PROPERTIES OF THERMOPLASTIC URETHANE/ POLYETHYLENE TEREPHTHALATE/GLASS | | | |
|---|---|---|---|
| | 70% TPU 30% Glass | 35% TPU 35% PET 30% Glass | 70% PET 30% Glass |
| Surface Smoothness, Taylor-Hobson Surtronic 10 Gauge | 0.3 microns | 0.3 microns | *Could not be molded at 250° C. |
| Tensile Strength, ASTM D638 | 11,700 psi | 9,400 psi | 14,700 psi |
| Elongation | 12.6% | 5.8% | 4.0% |
| Tensile Modulus | 520,000 psi | 815,000 psi | 1,160,000 psi |
| Heat Deflection Temperature @ 264 psi ASTM D698 | 116° C. | 136° C. | 150+° C. |

TABLE IV-continued

PROPERTIES OF THERMOPLASTIC URETHANE/
POLYETHYLENE TEREPHTHALATE/GLASS

|  | 70% TPU<br>30% Glass | 35% TPU<br>35% PET<br>30% Glass | 70% PET<br>30% Glass |
|---|---|---|---|
| Annealed at 120° C. | | | |

*The PET would not mold at 260° C., but plugged the injection sprue. These data are for PET molded at 274° C.

This example shows the excellent surface smoothness of the TPU/PET/glass blend at conditions where PET cannot even be molded. TPU/PET/glass blend has much better melt flow than PET/glass and has significantly better modulus and heat deflection temperature than TPU/glass. This is a unique and useful combination and is achieved using a mold temperature of 45° C., at a temperature which is far below 110° C. which is conventional to the art.

EXAMPLES 7 AND 8

Thermoplastic Urethane/Polyethylene Terephthalate/Glass

A composite of 35 percent thermoplastic urethane (Estane 58137), 35 percent polyethylene terephthalate (recycled bottle resin), and 30 percent glass was made on a Warner-Pflieder compounding twin-screw extruder. The TPU was characterized by its low viscosity of $7-8 \times 10^2$ poise, measured on a 20/1, L/D capillary rheometer at 100 sec$^{-1}$ shear rate and 260° C. The PET was characterized by its high viscosity of $6-15 \times 10^3$ poise, measured on a 20/1, L/D capillary rheometer at 100 sec$^{-1}$ shear rate and 260° C. The glass was ¼ inch chopped "E" glass.

The TPU and PET were dried for two hours at 100° C. Then the TPU and PET were mixed on the Warner-Pflieder compounding twin-screw extruder, adding granules of these materials at the rear extruder port. Down stream, after these materials were mixed and heated to about 240° C., glass was added. Work and mixing were continued on the compounding extruder. This composite blend was extruded through an underwater pelletizing die at the end of the extruder, set at about 260° C. The knife chopped the strands into pellets at the die face.

The pellets were dried 4 hours at 105° C. The injection molding was carried out in a physical property mold. The mold temperature was set at 45° C. The melt temperature achieved was 250° C. A second similar example was made wherein the TPU was 30 percent weight, the PET was 30 percent weight, and the glass was 40 percent weight. The molded properties are set forth below:

Physical data are set forth in Table V.

TABLE V

|  | Example 7<br>30% Glass | Example 8<br>40% Glass |
|---|---|---|
| Surface smoothness, Taylor-Hobson Surtronic 10 Gauge | 0.2 microns | 0.2 microns |
| Tensile strength, ASTM D 638 | 13,000 psi | 17,000 psi |
| Elongation | 5.8% | 2.6% |
| Tensile modulus | 1,000,000 psi | 1,700,000 psi |
| Flexural strength, ASTM D 790 | 22,000 psi | 32,000 psi |
| Flexural modulus | 850,000 psi | 1,500,000 psi |
| Vicat softening, ASTM D 1525 B | 173° C. | 196° C. |
| Heat Deflection Temperature @ 264 psi, ASTM D 698 annealed at 120° C. | 135° C. | — |
| Izod impact, ASTM D 638 | | |
| unnotched | 20 ft. lbs./in. | 15 ft. lbs./in. |
| notched | 3 ft. lbs./in. | 3.7 ft. lbs./in. |
| Coefficient of linear thermal expansion −30 to +30° C., ASTM D 696 | $1.7 \times 10^{-5}$ in/in °C. | — |

As apparent from Table V, fiber-reinforced thermoplastic molding compositions were obtained having extremely high tensile modulus, flexural modulus, heat deflection temperatures, impact resistance, and the like, and yet, the surface was extremely smooth. Inasmuch as the surface is essentially urethane-rich, it is readily paintable without being primed.

While in accordance with the Patent Statutes, the best mode and preferred embodiment has been set forth, the scope of the invention is not limited thereto, but rather by the scope of the attached claims.

What is claimed is:

1. A thermoplastic molded article, comprising:
   a fiber-reinforced, two-phase, thermoplastic article, said article containing a thermoplastic polyurethane component and an immiscible thermoplastic polymer component which is PET, PETG, polycarbonate, polyacetal, or an ABS copolymer,
   said article having a surface layer rich in said thermoplastic polyurethane component and substantially free of said fibers, and a two-phase interior portion containing said thermoplastic polyurethane component, said immiscible thermoplastic polymer component, and said fibers.

2. A thermoplastic molded article according to claim 1, wherein said article of said thermoplastic polyurethane, said immiscible thermoplastic polymer component, and said fibers is prepared in the presence of high shear.

3. A thermoplastic molded article according to claim 2, wherein the amount of said thermoplastic polyurethane is from about 15 to about 85 percent by weight and wherein the amount of said immiscible thermoplastic polymer component is from about 85 percent to about 15 percent by weight based upon the total weight of said thermoplastic polyurethane component and said immiscible thermoplastic polymer component, and wherein the amount of said fibers if from about 5 parts to about 60 parts by weight based upon the total weight of said thermoplastic polyurethane component, said immiscible thermoplastic polymer component, and said fibers.

4. A thermoplastic molded article according to claim 3, wherein said high shear is a shear rate of at least 100 reciprocal seconds, wherein said surface layer has a thickness of at least 0.5 mils, wherein the amount of said thermoplastic polyurethane component is from about 25 to about 75 percent by weight and wherein the amount of said immiscible thermoplastic polymer component is from about 75 percent to about 25 percent by weight based upon the total weight of said thermoplastic polyurethane component and said immiscible thermoplastic polymer component, and wherein the amount of said fibers is from about 15 parts to about 50 parts by weight based upon the total weight of said thermoplastic polyurethane component, said immiscible thermoplastic polymer component, and said fibers.

5. A thermoplastic molded article according to claim 4, wherein said shear rate is at least 500 reciprocal seconds.

6. A thermoplastic molded article according to claim 5, wherein said surface layer has a thickness of from about 1.0 to about 5.0 mils.

7. A thermoplastic molded article according to claim 2, wherein said immiscible thermoplastic polymer component is PET or polycarbonate and wherein said fibers are glass fibers.

8. A thermoplastic molded article according to claim 6, wherein said immiscible thermoplastic polymer component is PET or polycarbonate and wherein said fibers are glass fibers.

9. A thermoplastic molded article according to claim 2, wherein said thermoplastic polyurethane component and said immiscible thermoplastic polymer component have a different viscosity in the presence of said high shear at a processing temperature, and wherein the viscosity ratio of said high viscosity component to said low viscosity component is from about 1.5 to about 1,000.

10. A thermoplastic molded article according to claim 8, wherein said thermoplastic polyurethane component and said immiscible thermoplastic polymer component have a different viscosity in the presence of said high shear at a processing temperature, and wherein the viscosity ratio of said high viscosity component to said low viscosity component is from about 5 to about 50.

11. A thermoplastic molded article, comprising:
a fiber-reinforced, multi-phase thermoplastic article, said article containing a thermoplastic polymer and an immiscible thermoplastic polymer component, said article having a smooth surface layer essentially free of said fibers and rich in one of said immiscible thermoplastic polymer components, and at least a two-phase interior portion containing said thermoplastic polymer, said an immiscible thermoplastic polymer component, and said fibers, said thermoplastic polymer component and said an immiscible thermoplastic polymer component being selected from thermoplastic polyurethane PET, PETG, polyacetal, polycarbonate, ABS copolymers, PVC, copolymers of polyester-ether, SAN copolymers, polyacrylate, poly(phenylene oxide, polysulfone, polybutylene, polyethylene, polypropylene, or polystyrene.

12. A thermoplastic molded article according to claim 11, wherein the amount of said thermoplastic polymer is from about 15 percent to about 85 percent by weight and wherein the amount of said an immiscible thermoplastic polymer component is from about 85 percent to about 15 percent by weight based upon the total weight of said thermoplastic polymer and said an immiscible thermoplastic polymer component, and wherein the amount of said fibers is from about 5 percent to about 60 percent by weight based upon the total weight of said thermoplastic polymer, said an immiscible thermoplastic polymer component and said fibers.

13. A thermoplastic molded article according to claim 12, wherein said article of said thermoplastic polymer, said an immiscible thermoplastic polymer component, and said fibers is prepared in the presence of high shear, and wherein said high shear is a shear rate of at least 100 reciprocal seconds, and wherein said surface layer has a thickness of at least 0.5 mils.

14. A thermoplastic molded article according to claim 13, wherein said shear rate is at least 500 reciprocal seconds.

15. A thermoplastic molded article according to claim 14, wherein the amount of said thermoplastic polymer is from about 25 percent to about 75 percent by weight and wherein the amount of said an immiscible thermoplastic polymer component is from about 75 percent to about 25 percent by weight based upon the total weight of said thermoplastic polymer an said an immiscible thermoplastic polymer component, and wherein the amount of said fibers is from about 15 percent to about 50 percent by weight based upon the total weight of said thermoplastic polymer, said an immiscible thermoplastic polymer component and said fibers.

16. A thermoplastic molded article according to claim 15, wherein said surface layer a thickness of from about 1.0 to about 5 mils.

17. A thermoplastic molded article according to claim 11, wherein said thermoplastic polymer and said an immiscible thermoplastic polymer component is selected from polyurethane, PET, PETG, polycarbonate, polyacetal, or an ABS copolymer, wherein the amount of said thermoplastic polymer is from about 40 percent to about 60 percent by weight and wherein the amount of said an immiscible thermoplastic polymer component is from about 60 percent to about 40 percent by weight based upon the total weight of said thermoplastic polymer and said an immiscible thermoplastic polymer component, and wherein the amount of said fibers is from about 25 percent to about 45 percent by weight based upon the total weight of said thermoplastic polymer, said an immiscible thermoplastic polymer component, and said fibers.

18. A thermoplastic molded article according to claim 15, wherein said thermoplastic polymer and said an immiscible thermoplastic polymer component is selected from polyurethane, PET, PETG, polycarbonate, polyacetal, or an ABS copolymer, wherein the amount of said thermoplastic polymer is from about 40 percent to about 60 percent by weight and wherein the amount of said an immiscible thermoplastic polymer component is from about 60 percent to about 40 percent by weight based upon the total weight of said thermoplastic polymer and said an immiscible thermoplastic polymer component, and wherein the amount of said fibers is from about 25 percent to about 45 percent by weight based upon the total weight of said thermoplastic polymer, said an immiscible thermoplastic polymer component, and said fibers.

19. A thermoplastic molded article according to claim 17, wherein said thermoplastic polymer has a viscosity at said high shear at a processing temperature which is different than said an immiscible thermoplastic polymer component and wherein the viscosity ratio of said high viscosity component to said relatively low viscosity component is from about 1.5 to about 1,000.

20. A thermoplastic molded article according to claim 18, wherein said thermoplastic polymer has a viscosity at said high shear at a processing temperature which is different than said an immiscible thermoplastic polymer component and wherein the viscosity ratio of said high viscosity component to said relatively low viscosity component is from about 5 to about 50.

* * * * *